United States Patent [19]

Hirano et al.

[11] Patent Number: 5,009,585
[45] Date of Patent: Apr. 23, 1991

[54] OPTICAL MOLDING APPARATUS AND MOVABLE BASE DEVICE THEREFOR

[75] Inventors: Yoshinao Hirano; Katsumo Sato; Shigeru Nagamori; Katsuhide Murata, all of Chiba; Kazuhito Horikiri; Junji Shirai, both of Okayama, all of Japan

[73] Assignee: Mitsui Engineering & Shipbuilding Co., Ltd., Tokyo, Japan

[21] Appl. No.: 451,760

[22] Filed: Dec. 18, 1989

[51] Int. Cl.$^5$ .................. B29C 35/08; B05D 3/06
[52] U.S. Cl. .................. 425/174.4; 118/500; 118/620; 156/58; 156/273.3; 156/379.6; 156/538; 264/22; 264/308
[58] Field of Search ............ 425/112, 161, 162, 174.4, 425/375; 264/22, 1.4, 1.7, 250, 255, 308; 156/58, 59, 242, 272.2, 272.8, 273.3, 273.5, 275.5, 379.6, 538; 365/106, 107, 119, 120, 126, 127; 269/71; 118/695, 697, 620, 500; 427/54.1, 43.1

[56] References Cited

U.S. PATENT DOCUMENTS

| | | | |
|---|---|---|---|
| 2,775,758 | 12/1956 | Munz | 156/58 |
| 4,575,330 | 3/1986 | Hull | 425/174.4 |
| 4,752,498 | 6/1988 | Fudim | 425/174.4 |
| 4,801,477 | 1/1989 | Fudim | 264/22 |
| 4,942,060 | 7/1990 | Grossa | 427/54.1 |

FOREIGN PATENT DOCUMENTS

| | | |
|---|---|---|
| 0171069 | 2/1986 | European Pat. Off. |
| 0379068 | 7/1990 | European Pat. Off. |
| 60-247515 | 12/1985 | Japan |
| 62-35966 | 2/1987 | Japan |
| 62-40458 | 2/1987 | Japan |
| 62-101408 | 5/1987 | Japan |
| 88/06494 | 9/1988 | PCT Int'l Appl. |

OTHER PUBLICATIONS

Kodoma, Hideo, "Automatic Method for Fabricating a Three-Dimensional Plastic Model with Photo-Hardening Polymer", *Rev. Sci. Instrum.*, vol. 52, No. 11, Nov. 1981, pp. 1770–1773.

Lindsay, Karen, "Desktop Product Prototyping: Services and Systems Proliferate", *Modern Plastics*, Jul. 1989, p. 90.

*Primary Examiner*—James C. Housel
*Attorney, Agent, or Firm*—Kanesaka and Takeuchi

[57] ABSTRACT

An optical molding apparatus is used for an optical molding method including the steps of radiating light onto a photocurable resin so as to cure the irradiated portion and laminating the cured objects. The apparatus comprises: a container provided with an aperture on a bottom surface or a side surface thereof; a base which is movably away from a surface of the aperture; a light radiation apparatus for radiating light into the container through the aperture; and a cured object holding plate which is freely mounted and dismounted from above the base. A movable base device for the optical molding apparatus comprises the base and an elevator erected on a peripheral edge of the container so as to lift and lower the base. The base is provided with a frame, one end thereof constituting a slide portion vertically moved along the elevator, a model holding plate removably mounted on the frame, frame supporting members with the base end sides thereof rotatably supported by the slide portion. The frame supporting members assume both a supporting state for supporting the frame when they are connected to the frame and an evacuated state when the connection is released and the free end sides are rotated upward.

3 Claims, 9 Drawing Sheets

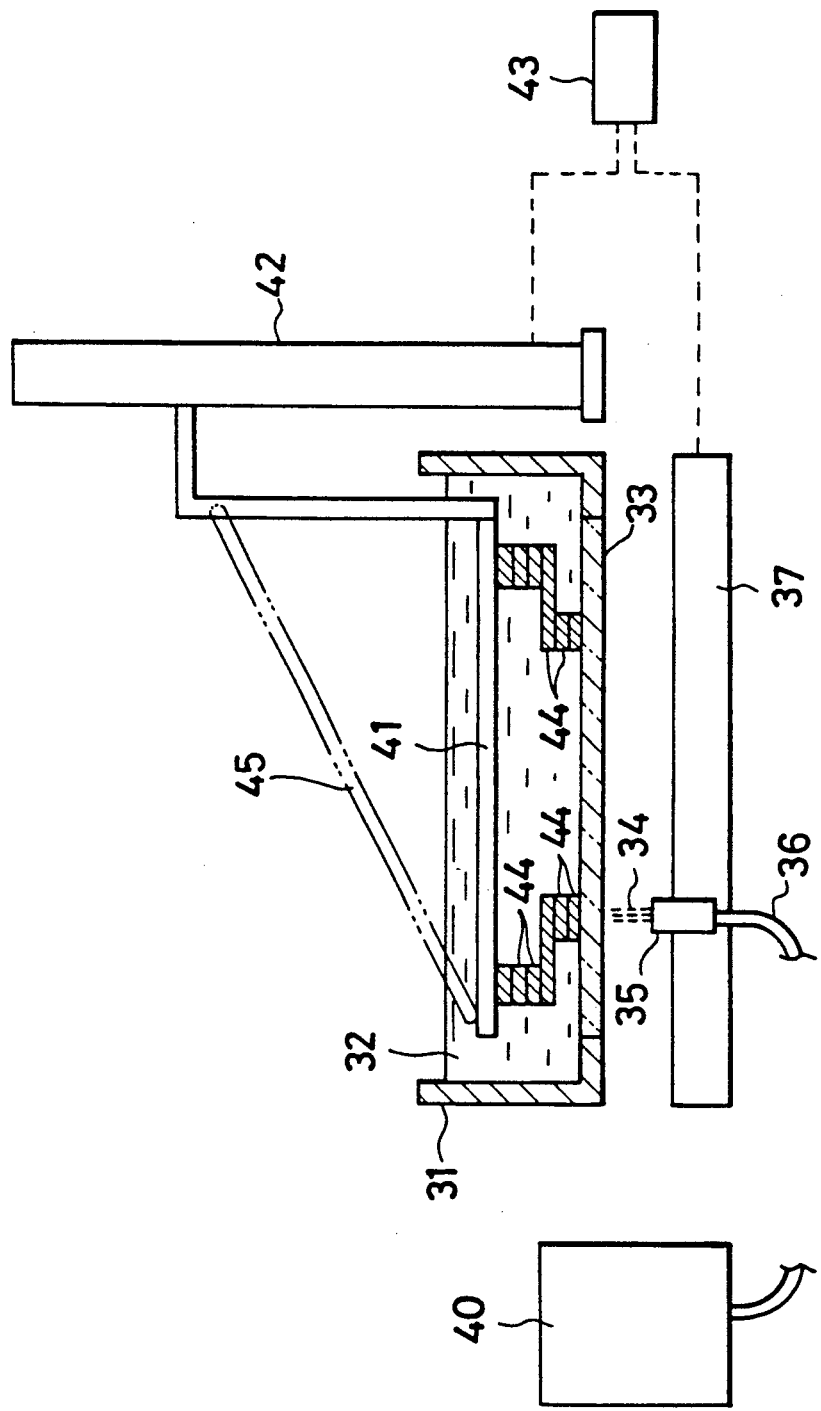

OPTICAL MOLDING APPARATUS AND MOVABLE BASE DEVICE THEREFOR

FIELD OF THE INVENTION AND RELATED ART STATEMENT

The present invention relates to an optical molding apparatus and a movable base device thereof used for an optical molding method for producing a cured object (model) having a desired shape by radiating a light flux onto a photocurable resin. More particularly, the present invention relates to an optical molding apparatus which is so constructed as to radiate light onto a photocurable resin in a container through an aperture provided on the container.

Optical molding methods for optically producing a target object by repeating the process of radiating a light flux on a photocurable resin so as to cure the irradiated portion and extend the cured portion continuously in the horizontal direction, supplying a photocurable resin on the upper side of the cured portion and radiating a light flux on the resin so as to also extend the cured portion continuously in the vertical direction are known as disclosed in, for example, Japanese Patent Laid-Open Nos. 247515/1985, 35966/1987 and 10140/1987. A method of using a mask in place of the scanning by a light flux is also known.

As an apparatus for executing these methods, an apparatus includes a container having an aperture on the bottom surface thereof, a device for radiating a light flux through the aperture, and a base provided in the container in such a manner as to be movable away from the aperture by means of an elevator.

FIG. 15 is a sectional view of the schematic structure of this kind of optical molding apparatus.

In FIG. 15, a photocurable resin 32 is accommodated in a container 31. On the bottom surface of the container 31, an aperture 33 made of a light transmitting plate such as a silica glass plate is provided. An optical system (light radiation device) is provided which is composed of a light emitting portion 35 with a built-in lens for radiating a light flux 34 onto the aperture 33, an optical fiber 36, an X-Y table 37 for moving the light emitting portion 35 in the X-Y direction in the horizontal plane, wherein X and Y are two directions orthogonal to each other, and a light source 40.

A base 41 is disposed in the container 31 so as to be lifted by an elevator 42. The X-Y table 37 and the elevator 42 are controlled by a computer 43.

When a cured object is produced by the above-described apparatus, the base 41 is first located slightly above the aperture 33 and the light flux 34 scans a horizontal section (the portion corresponding to the bottom surface or the upper surface, in this case) of the target object. The scanning operation is carried out by moving the X-Y table 37 controlled by the computer.

After the entire surface of that horizontal section of the target object has been irradiated with light, the base 41 is slightly lifted and an uncured photocurable resin is poured between the cured object (cured layer) 44 and the aperture 33, and light is radiated in the same way as above. By repeating this process, the cured object (model) having the intended configuration is obtained as a laminate.

In the apparatus shown in FIG. 15, the scanning operation of the light flux 13 is carried out by moving the X-Y table 37, but it is possible to adopt an optical system instead in which the light emitted from the light source and reflected by a mirror (not shown) is converged by the lens so as to radiate the light onto the photocurable resin. In addition, a masking method may be adopted in place of the scanning operation of the light flux 34.

In the above-described conventional apparatus, the elevator 42 is erected only on one side of the container 31, and one end side of the base 41 is supported by the elevator 42 in a cantilever state.

The reason for supporting the base 41 in a cantilever state in this way is that the disposition of the elevator 42 at one side of the container 31 requires only a small space and that the base can be approached from three directions. If it is possible to approach the base 41 from three directions, mounting and dismounting of the base 41 and the removal of the cured object which has adhered to the under surface of the base 41 are facilitated.

In this type of apparatus, the cured object 44 of the photocurable resin 12 is formed between the base 41 and the aperture 33 by the light radiated from the light emitting portion 35 onto the photocurable resin 32 in the container 31, and the cured object 44 adheres to both surfaces of the base 41 (or the cured object on the base) and the aperture 33. It is necessary to separate the cured object 44 from the aperture 33 when the base 41 is moved away from the aperture 33. However, the cured object 44 is sometimes separated not from the aperture 33 but from the base 41, thereby interrupting the molding process.

In the optical molding apparatus provided with the container 31 having the aperture 33 on the surface thereof, as shown in FIG. 15, after a cured object for a first layer is formed on the undersurface of the base 41 by radiating light, the base 41 is lifted by a predetermined pitch, and a cured object for a second layer is next formed on the cured object for the first layer by radiation of light. This process is repeated to produce a target object (solid body). In this type of apparatus, therefore, the target object is obtained in the state of having adhered to the undersurface of the base 41.

In order to remove the target object which has adhered to the undersurface of the base 41 in this way, it is necessary to remove the base 41 itself from the molding apparatus, which operation requires much labor. In addition, the target object immediately after the production by an optical molding apparatus contains uncured photocurable resin, which sometimes lowers the strength of the target object. Consequently, there is a fear of the target object being damaged by the vibration, shock, horizontal force, etc., externally applied thereto during the removal of the base 41.

In addition, since the base 41 is supported in a cantilever state, as shown in FIG. 15, the free end side (left end side, in FIG. 15) of the base 41 is apt to vertically move, thereby making it difficult to maintain the accuracy of the horizontality of the base 41.

As a countermeasure, a method of providing a supporting member such as that represented by the reference numeral 45 in FIG. 15 may be considered, but such a supporting member 45 obstructs the operation of removing the cured object (model) from the base 41. If the base 41 is composed of a frame and a model fixing plate or the like which is removably mounted on the frame, the supporting member 45 makes the mounting and dismounting operation of the model holding plate difficult.

OBJECT AND SUMMARY OF THE INVENTION

Accordingly, it is an object of the present invention to eliminate the above-described problems in the prior art and to provide an optical molding apparatus which ensures the separation of a cured object from the surface of an aperture.

It is another object of the present invention to provide an optical molding apparatus which enables a target object from being easily and swiftly taken out without being damaged.

It is still another object of the present invention to provide a movable base device for an optical molding apparatus which is capable of maintaining the horizontality of a base at high accuracy and avoiding the deterioration of the workability due to a supporting member.

To achieve this aim, in a first aspect of the present invention, there is provided an optical molding apparatus for producing a cured object on the surface of a base or on a cured object on the surface of the base by radiating a light flux onto a photocurable resin in a container through an aperture, characterized in that the surface of the base on the side of the aperture has a better adhesion with the cured object than the surface of the aperture on the inner wall side of the container.

According to this apparatus, when the base is moved, the cured object is separated from the surface of the aperture with certainty.

In a second aspect of the present invention, there is provided an optical molding apparatus for producing a target object by laminating cured object on the undersurface of a base by radiating light from an aperture provided on the bottom surface of a container, characterized in that the base is provided with a model holding plate which is freely mounted to and dismounted from above the base.

According to this apparatus, the target object is produced on the undersurface of the model holding plate as a laminate of cured objects. By taking out the model holding plate upwardly from the base, the target object produced is also taken out as a whole together with the model holding plate.

In a third aspect of the present invention, there is provided a movable base device for an optical molding apparatus which is used for an optical molding method including the steps of radiating light onto a photocurable resin, curing the irradiated portion and laminating cured objects, the movable base device comprising a base provided so as to face an aperture provided on the bottom surface of a container for accommodating the photocurable resin and an elevator for lifting and lowering the base, the base being supported by the elevator in a cantilever state.

In this movable base device, the base is provided with a frame, one end side of which constitutes a slide portion which is vertically moved along the elevator and a model fixing plate which is removably mounted on the frame. The base is further provided with frame supporting members with the base end sides rotatably supported by the slide portion and the free end sides vertically rotatable. The frame supporting members fall down on the frame, and they can assume a supporting state for supporting the frame when they are connected to the frame and an evacuated state when the connection is released and the free end sides are rotated upward.

In the movable base device, since the supporting member supports the free end side of the base, it is possible to maintain the horizontality of the base at high accuracy.

The supporting member can be evacuated upwardly by releasing the connection with the frame. When the supporting member is evacuated in this way, the operation of mounting and dismounting the model fixing plate on and from the frame is facilitated.

The above and other objects, features and advantages of the present invention will become clear from the following description of the preferred embodiments thereof, taken in conjunction with the accompanying drawings.

BRIEF DESCRIPTION OF THE DRAWINGS

FIG. 15 is a side elevational view of a conventional apparatus.

DESCRIPTION OF THE PREFERRED EMBODIMENTS

Embodiments of the present invention will be explained hereinunder with reference to the accompanying drawings.

Figure 1:
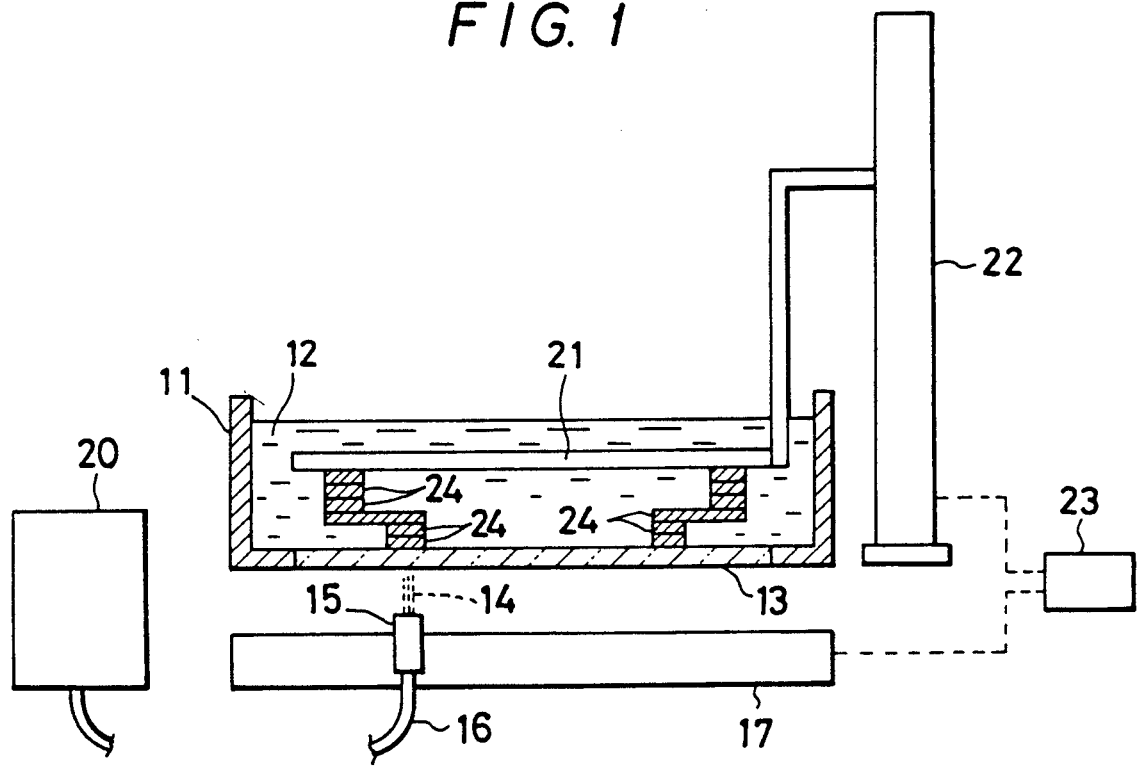
FIGS. 1 and 2 show the structures of a first embodiment of an optical molding apparatus according to the present invention.

FIG. 1 is a sectional view of the structure of a first embodiment of an optical molding apparatus according to the present invention.

In FIG. 1, a photocurable resin 12 is accommodated in a container 11. On the bottom surface of the container 11, an aperture 13 made of a light transmitting plate such as a silica glass plate subjected to reflection less coating is provided. An optical system is provided which is composed of a light emitting portion 15 with a built-in lens for radiating a light flux 14 onto the aperture 13, an optical fiber 16, an X-Y table 17 for moving the light emitting portion 15 in the X-Y direction in the horizontal plane, wherein X and Y are two directions orthogonal to each other, and a light source 20.

A base 21 is disposed in the container 11 so as to be lifted by an elevator 22. The X-Y table 17 and the elevator 22 are controlled by a computer 23. The undersurface of the base 21 is subjected to surface-roughing treatment so that the undersurface of the base 21 has a better adhesion with respect to the cured object 24 than the upper surface of the aperture 13.

When a cured object is produced by the above-described apparatus, the base 21 is first located slightly above the aperture 13 and the light flux 14 scans a horizontal section of the target object. The scanning operation is carried out by moving the X-Y table 17 controlled by the computer 23.

After the entire surface of the horizontal section (the portion corresponding to the bottom surface or the upper surface, in this case) of the target object has been irradiated with light, the base 21 is slightly lifted and an uncured photocurable resin is poured between the cured object 24 and the aperture 13, and light is radiated in the same way as above. By repeating this process, the cured object having the intended configuration is obtained as a laminate. In the molding process, when the base 21 is lifted, the cured object 24 is separated from the surface of the aperture 13 with certainty, thereby precluding a possibility of the interruption of the molding process.

The base 21 is subjected to surface-roughing treatment in this embodiment. Alternatively, a surface layer which has a good adhesion with the cured object may be formed on the surface of the base 21 on the side of the aperture 13. Such a surface layer is formed by baking or applying a synthetic resin having a good adhesion with the cured object 24 onto the base 21. Alternatively, such a synthetic resin film may be pasted to the base 21. The surface may be made of a metal or an inorganic material which has a good adhesion with the cured object in place of a synthetic resin.

It is also possible to treat the surface of the aperture 13 so as to enhance releasability of the cured object from the surface of the aperture 13 on the inner wall side of the container 11.

In this embodiment, the aperture 13 is provided on the bottom surface of the container 11 and light is radiated from below the container 11. Alternatively, the aperture 13 may be provided on a side surface of the container 11 and light is radiated from the side surface of the container 11. In this case, the base 21 is gradually moved sideways in the production process.

In this embodiment, the scanning operation of the light flux 14 is carried out by moving the X-Y table 17 but it is possible to adopt an optical system instead in which the light emitted from the light source and reflected by a mirror (not shown) is thereafter converged by the lens so as to radiate the light onto the photocurable resin. In this case, the scanning operation of the light flux 14 is carried out by rotating the mirror.

Figure 2:
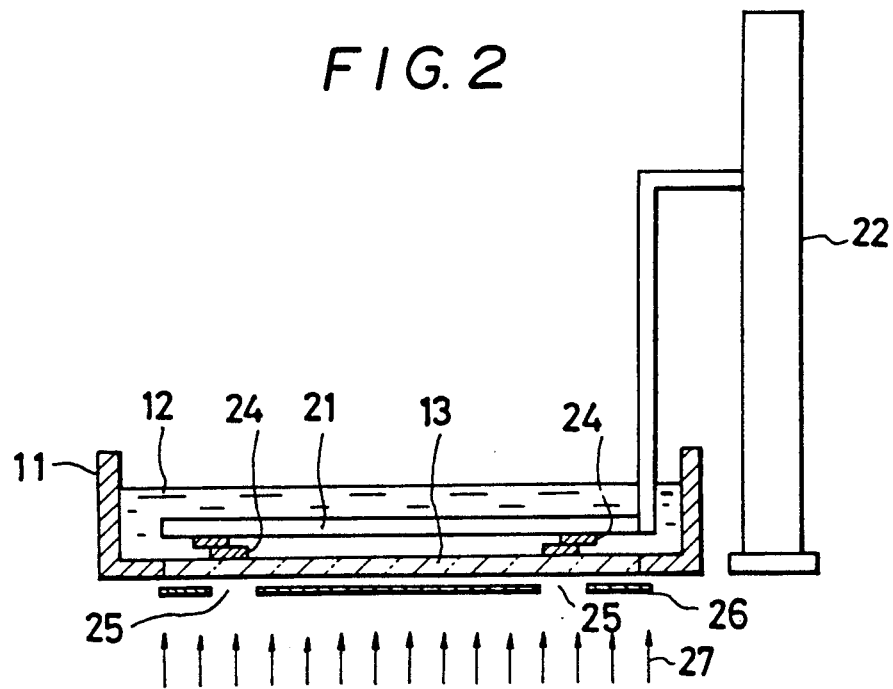

Although the cured object 24 is produced by the scanning of the light flux 14 in this embodiment, a known masking method may be applied to the second embodiment. For example, a mask 26 provided with slits 25 and having a configuration which corresponds to the section of the target object may be used instead, as shown in FIG. 2. The reference numeral 27 represents a parallel light flux in FIG. 2, and the other reference numerals represents the corresponding elements in FIG. 1.

As described above, according to the first embodiment of an optical molding apparatus of the present invention, the cured object is separated from the surface of the aperture with certainty, thereby enabling a smooth progress of the molding process.

Figure 3:
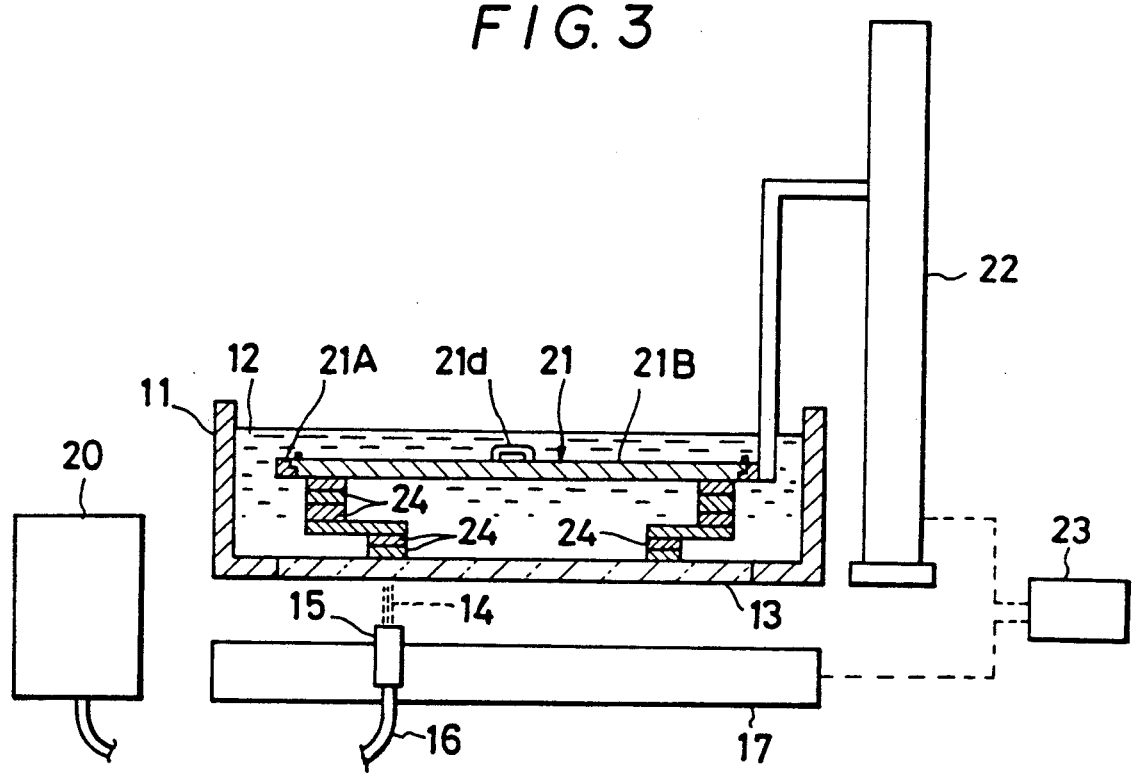
FIG. 3 is a vertical sectional view of a second embodiment of an optical molding apparatus according to the present invention.
Figure 4:
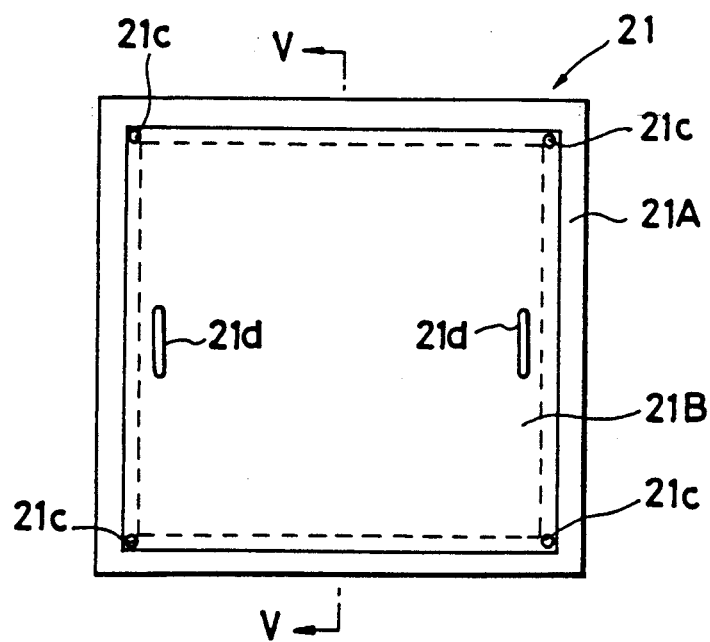
FIG. 4 is a plan view of the base of the second embodiment shown in FIG. 3.
Figure 5:
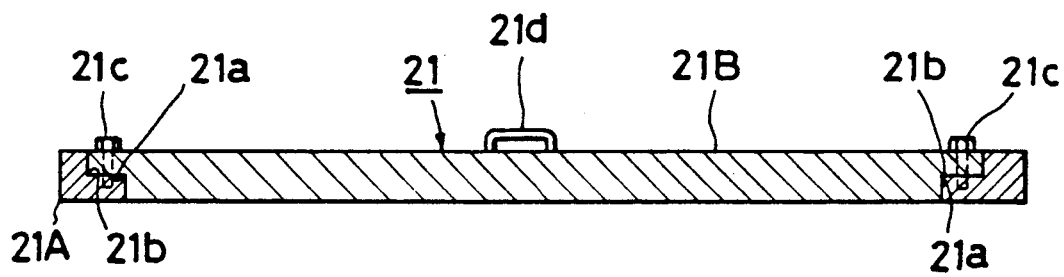
FIG. 5 is an enlarged sectional view of the base shown in FIG. 4, taken along the line V—V.

FIG. 3 is a sectional view of a second embodiment of an optical molding apparatus according to the present invention, FIG. 4 is a plan view of the base and FIG. 5 is a sectional view of the base.

In FIG. 3, the same reference numerals are provided for the elements which are the same as those shown in FIG. 1. In the embodiment shown in FIG. 3, the base 21 is composed of a frame 21A having a square shape and a model holding plate 21B which is inserted into the frame 21A. The bottom portion of the model holding plate 21B is flush with the bottom portion of the frame 21A or protrudes therefrom. Stepped portions 21a and 21b are provided on the inner periphery of the frame 21A and the outer periphery of the model holding plate 21B, respectively, so that the stepped portion 21b of the model holding late 21B is engaged with the stepped portion 21a of the frame 21A from above, thereby supporting the model holding plate 21B by the frame 21A. The corner portions of the model holding plate 21B is secured to the frame 21A by bolts 21c. Handles 21d are provided on the model holding plate 21B.

When a cured object is produced by the above-described apparatus, the base 21 is first located slightly above the aperture 13 and the light flux 14 scans a horizontal section of the target object. The scanning operation is carried out by moving the X-Y table 17 controlled by the computer 23.

After the entire surface of the horizontal section (the portion corresponding to the bottom surface or the upper surface, in this case) of the target object has been irradiated with light, the base 21 is slightly lifted and an uncured photocurable resin is poured between the cured object 24 and the base 21, and light is radiated in the same way as above. By repeating this process, the cured object having the intended configuration (target object) is obtained as a laminate.

When the target object is removed from the optical molding apparatus, the necessary operation is lifting the model holding plate 21B by grasping the handles 21d after removing the bolts 21. The target object is thereby taken out upwardly together with the model holding plate 21B. This takeout operation can be carried out very easily and swiftly. In addition, since almost no vibration or shock is applied to the target object during the takeout operation, the possibility of the target object being damaged is completely precluded. Since it is also possible that after the model holding plate 21B is removed from the frame 21A, another model holding plate 21B is mounted on the frame 21A so as to start the next molding process, the operating efficiency of the apparatus is greatly enhanced.

The target object taken out together with the model holding plate 21B is removed from the model holding plate 21B by cutting the target object on the bonded surface of the model holding plate 21B or in the vicinity thereof. If necessary, the model holding plate 21B may be used as it is as the base for the target object. The target object is subjected to finishing or finish curing treatment, if necessary, before being supplied as a product.

Figure 6:
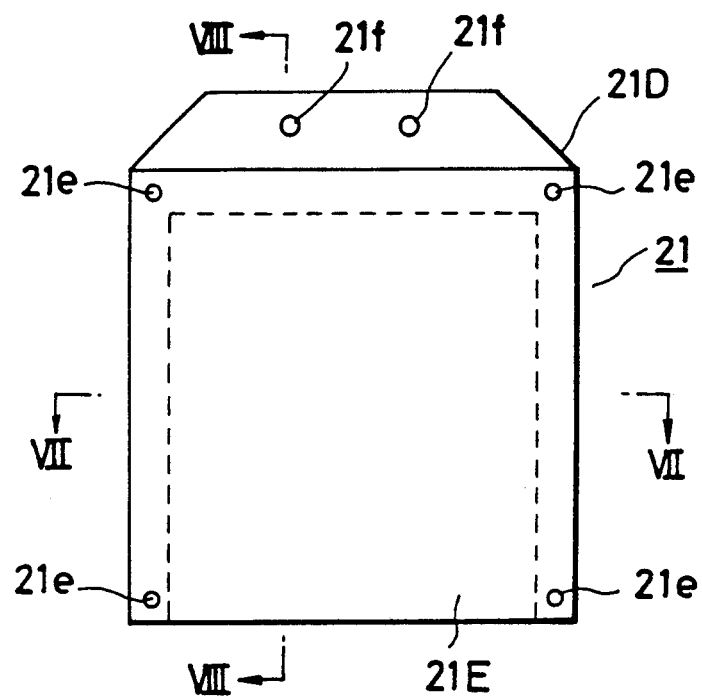
FIG. 6 is a plan view of another example of a base for the second embodiment.
Figure 7:
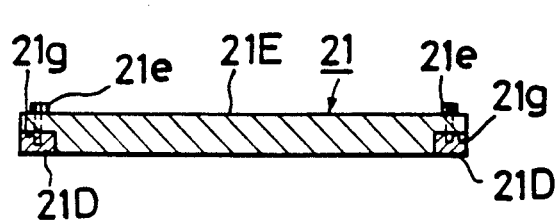
FIG. 7 is a sectional view of the base shown in FIG. 6, taken along the line VII—VII.
Figure 8:
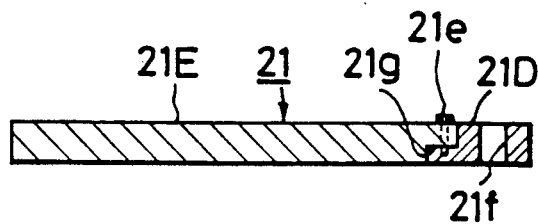
FIG. 8 is a sectional view of the base shown in FIG. 6, taken along the line VIII—VIII.

The base 21 is provided with the square frame 21A in this embodiment, a but U-shaped frame 21D such as that shown in FIGS. 6 to 8 may be adopted instead. A model holding plate 21E is placed on the frame 21D from above, and it is secured to the frame 21D by bolts 21e. Bolt holes for attaching the frame 21D to the elevator are provided in the frame 21D. A stepped portion 21g is provided on three side of the outer periphery of the model holding plate 21E, and the stepped portion 21g is engaged with the frame 21D.

It goes without saying that the above-described structures of the base are only examples, and the base may take other structures so long as the model holding plate can be mounted to and dismounted from above.

Figure 9:
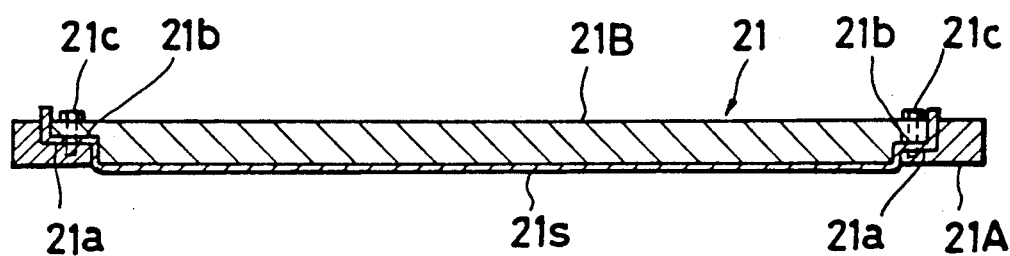
FIG. 9 is a sectional view of still another example of a base for the second embodiment.

It is also possible to removably provide a sheet material 21S on the undersurface of the model holding plate 21B, as shown in FIG. 9. The sheet material may be provided by inserting it between the frame 21A and the model holding plate 21B, or attached to the undersurface of the model holding plate 21B by various kinds of adhesives such as a pressure-sensitive adhesive and double-side adhesive. Provision of such a sheet material 21S further facilitates the removal of the target object from the model holding plate 21B. A sheet material may also be provided on the model holding plate 21E shown in FIGS. 6 to 8.

In this embodiment, the scanning operation of the light is carried out by moving the optical fiber in the directions of X and Y, but it is possible to adopt an optical system instead in which the light emitted from the light source and reflected by a mirror (not shown) is thereafter converged by the lens so as to radiate the light onto the photocurable resin. In this case, the scanning operation of the light flux 14 is carried out by rotating the mirror.

Figure 10:
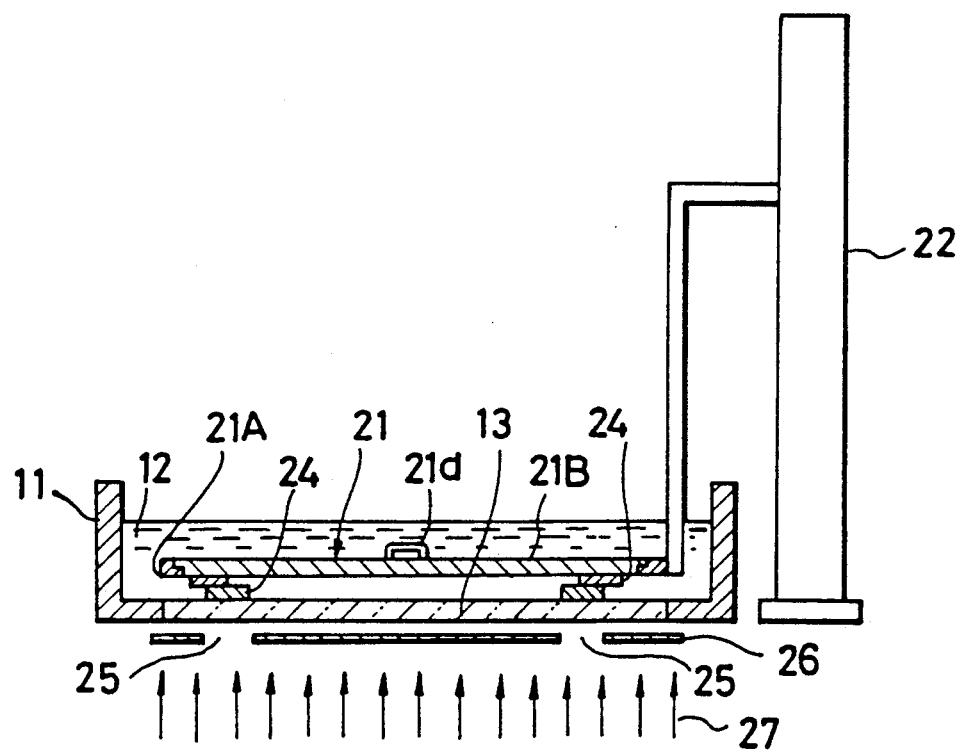
FIG. 10 is a vertical sectional view of a modification of the second embodiment.

Although the cured object 24 is produced by the scanning of the light flux 14 in this embodiment, a known masking method may be applied to the second embodiment. For example, a mask 26 provided with slits 25 and having a configuration which corresponds to the section of the target object may be used instead, as shown in FIG. 10. The reference numeral 27 represents a parallel light flux in FIG. 10, and the other reference numerals represents the corresponding elements in FIG. 3.

As described above, in the second embodiment of the optical molding apparatus of the present invention, since the target object is removed from the apparatus merely by lifting the model holding plate, the takeout operation can be carried out very easily and swiftly. In addition, there is no fear of the target object being damaged during this takeout operation. Furthermore, the operating efficiency of the apparatus is enhanced.

Figure 11:
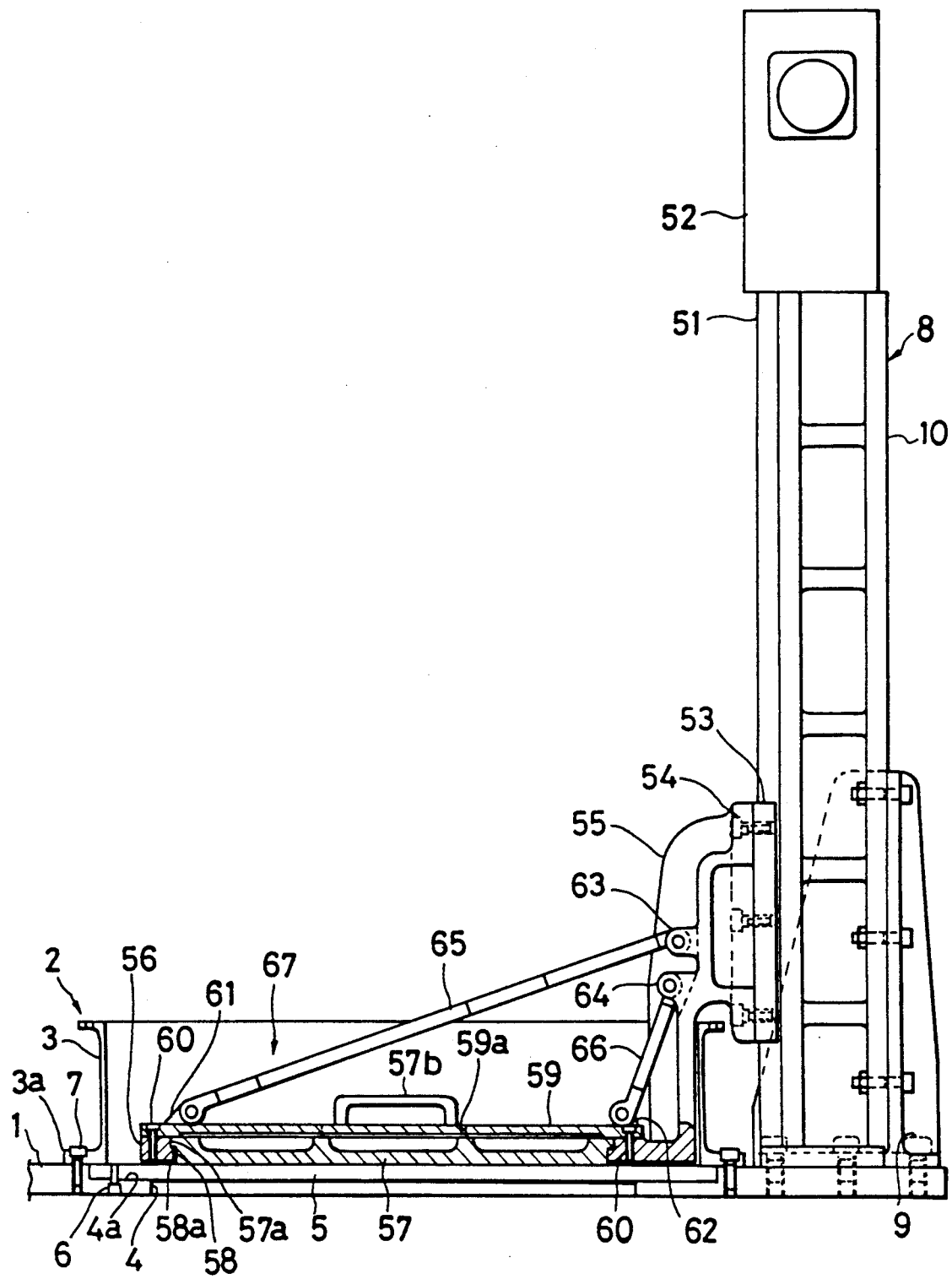
FIG. 11 is a side elevational view of a third embodiment of the present invention.
Figure 12:
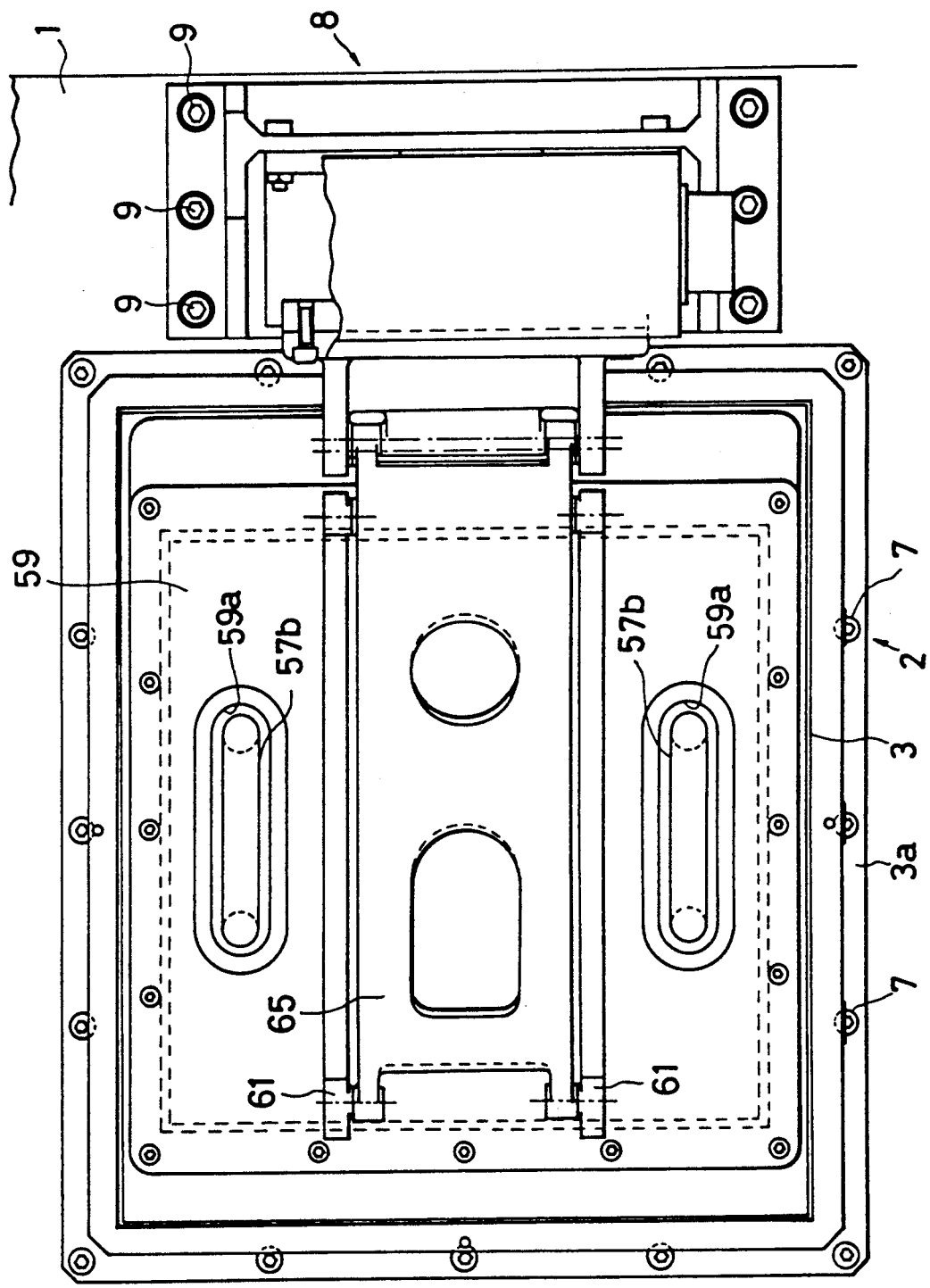
FIG. 12 is a plan view of the third embodiment shown in FIG. 11.
Figure 13:
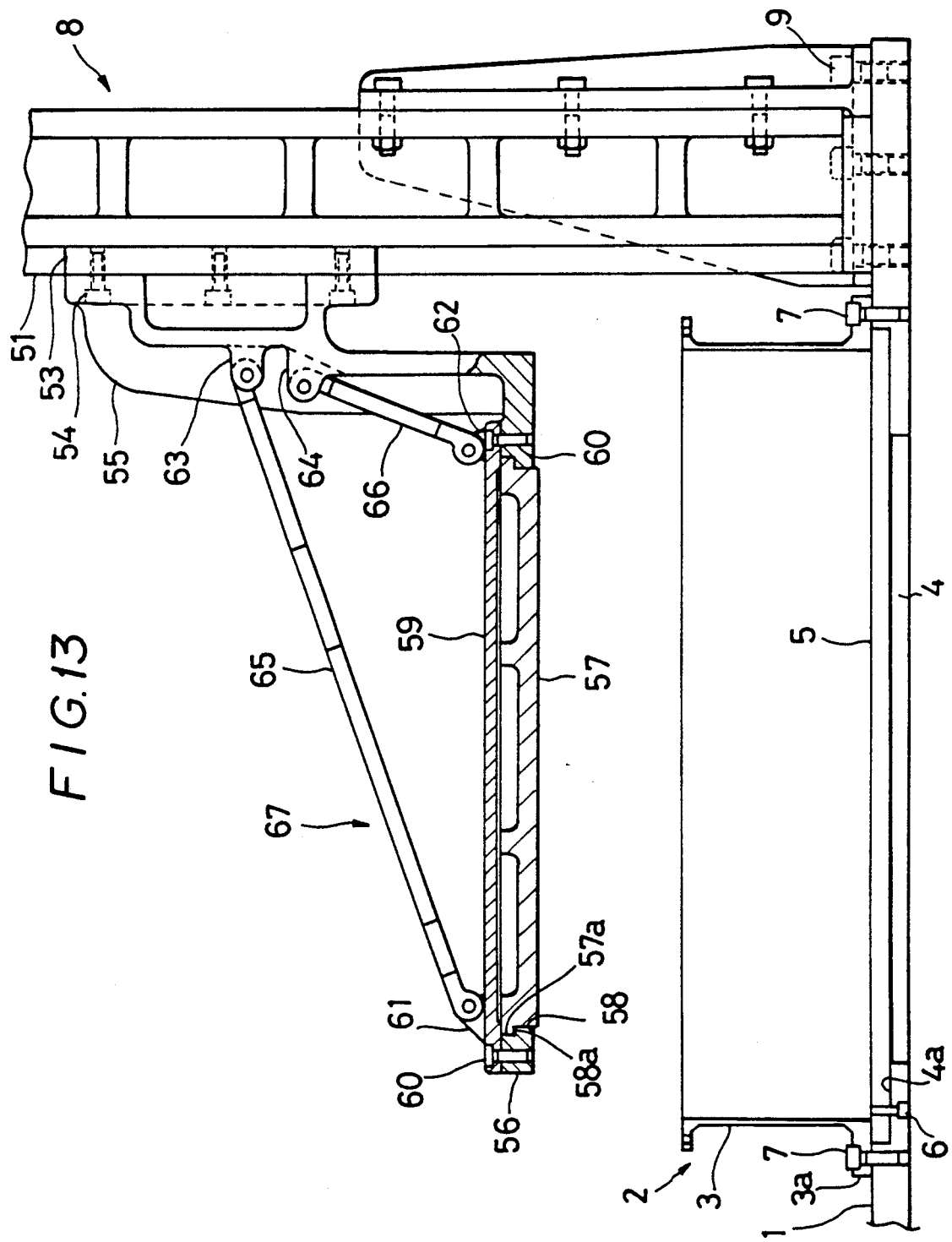
FIGS. 13 and 14 are explanatory views explaining the operation of the third embodiment.
Figure 14:
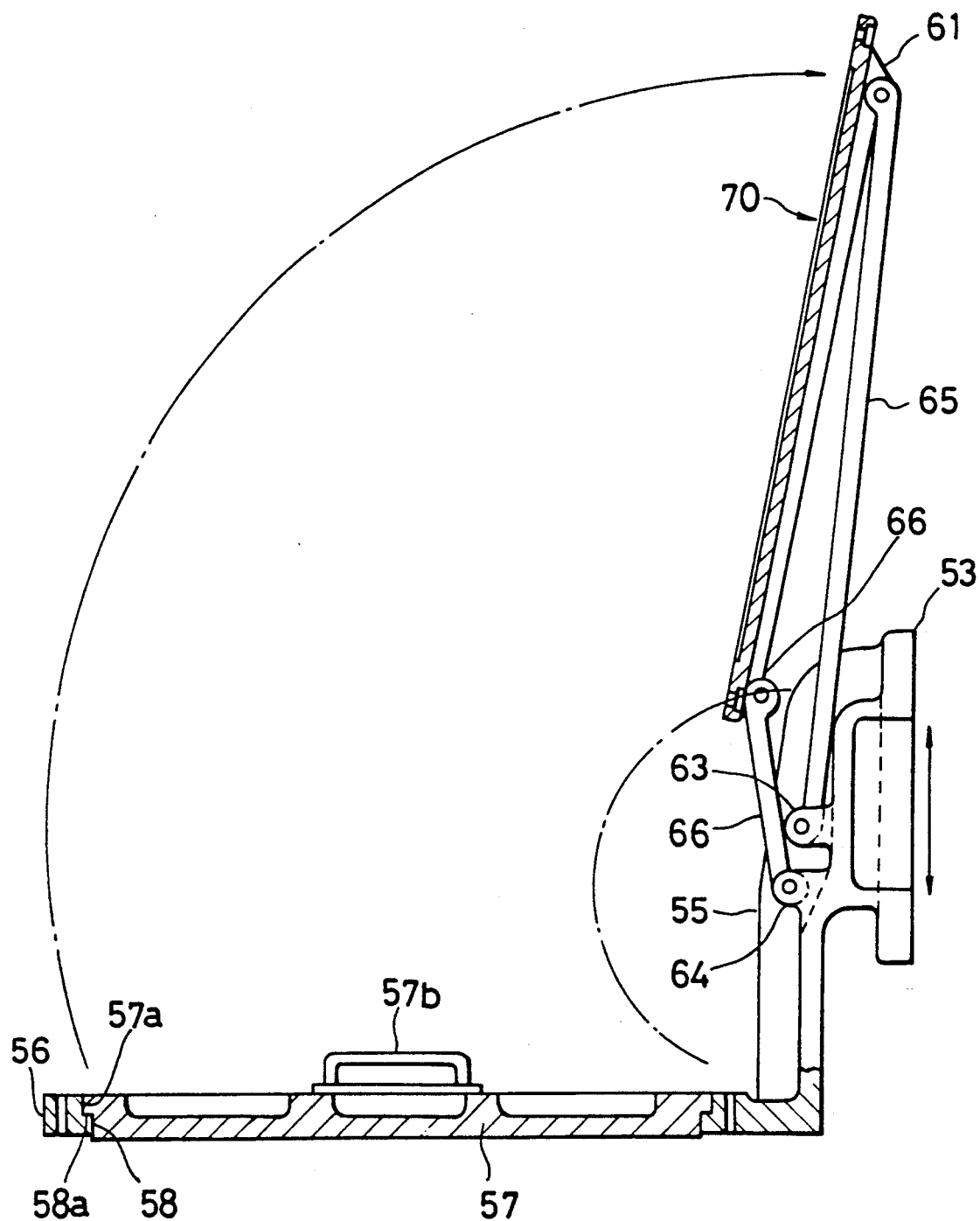

FIG. 11 is a side elevational view of a movable base device for an optical molding apparatus according to the present invention, FIG. 12 is a plan view thereof and FIGS. 13 and 14 are explanatory views of the opertion thereof.

The reference numeral 1 represents a bed to which a frame body constituting the side wall portion of a container 2 is attached. An opening slightly smaller than the frame body is formed in the bed 1 and a stepped portion 4a is provided on the upper edge of the opening 4. A light transmitting plate 5 is inserted into the stepped portion 4a. The stepped portion 4a is so designed as to be in contact with the underside of the frame body 3. A flange 3a is provided on the outer periphery of the frame body 3 at the lower end, and bolts 7 are screwed into the bed 1 through the flange 3a, thereby fixing the light transmitting plate 5. A port 6 is provided in the bed 1 so as to discharge the photocurable resin remaining at the bottom portion of the container 2 therethrough.

An elevator 8 is erected adjacent to the frame body 3. The elevator 8 is composed of a stand 10, the lower end of which is secured to the bed 1 by bolts 9, a guide rail 51 vertically provided on the front surface of the stand 10, and a driving portion 52 provided at the upper end of the stand 10.

A slide portion 53 is vertically movably engaged with the guide rail 51, and a bracket 55 is secured to the slide portion 53 by bolts 54. The bracket 55 is so designed as to extend forward from the slide portion 53 and then extend downward, and a horizontal frame 56 is integrally provided at the lower end portion of the bracket 55.

The frame 56 has a square shape in plan view and has an opening 58 for mounting a model holding plate 57 to which a cured object is stuck. A stepped portion 58a is provided on the upper edge of the opening 58, and a flange portion 57a provided on the side surface of the model holding plate 57 is engaged with the stepped portion 58a. The upper surface of the model holding plate 57 is covered with a presser plate 59, and the presser plate 59 is secured to the frame 56 by bolts 60. The reference numeral 57b represents a handle secured to the upper surface of the model holding plate 57 in such a manner as to be protrudable upward through an opening 59a provided on the presser plate 59.

Attachment seats 61, 62 and 63, 64 are integrally provided on the presser plate 59 and the bracket 55, respectively. A long frame supporting member 65 and a short frame supporting member 66 are provided so as to connect the attachment seats 61, 63 and 62, 64, respectively. Both ends of the frame members 65 and 66 are rotatably secured to the attachments seats 61, 63, 62 and 64, respectively.

A shaft (not shown) vertical to the slide portion 53 is connected to the slide portion 53, and the upper end side of the shaft is lifted accurately by a predetermined pitch by a precise driving mechanism including a step motor which is provided in the driving portion 52.

As is clear from the above explanation, a base 67 is composed of the slide portion 53, the bracket 55, the frame 56, the model holding plate 57 and the supporting members 65 and 66 in this embodiment.

The operation of the movable base device of this embodiment will be explained, By operating the precise driving mechanism in the driving portion 52, the slide portion 53 is vertically moved, and the frame 56 and the model holding plate 57, which are integrally provided with the slide portion 53 are also vertically moved. A photocurable resin is charged into the container 2, and the model holding plate 57 is first moved away from the light transmitting plate 5 by the distance corresponding to one layer of a cured body. Light is radiated from below the light transmitting plate 5 so as to cure the photocurable resin. After the cured body for the first layer is formed, the driving portion 52 is operated so as to lift the model holding plate 57 by a distance slightly larger than the thickness for a second layer (e.g., about 2 mm). When the model holding plate 57 is lifted, the cured body of the first layer is separated from the light transmitting plate 5 and a photocurable resin flows between the cured body of the first layer and the light transmitting plate 5. The model holding plate 57 is then lowered so that the gap between the model holding plate 57 and the light transmitting plate 5 agrees with the thickness of the second layer, and the surplus photocurable resin is discharged. Light is radiated from below the light transmitting plate 5 so as to form a cured body for the second layer. This process is repeated until the cured body for a desirable n-th layer is formed, thereby producing a target object (model).

When the target object is completed, the model holding plate 57 is lifted to a necessary height from the light transmitting plate 5, as shown in FIG. 13. After the bolts 60 are removed to release the connection between the frame 56 and the presser plate 59, the supporting members 65 and 66 are rotated upwardly, as shown in FIG. 14. Thereafter, the model holding plate 57 is lifted by grasping the handle 57b, whereby the model which has adhered to the undersurface of the model holding plate 57 is taken out. The reference numeral 70 in FIG. 14 represents an upper cover.

During this molding process, since the frame 56 is supported by the supporting members 65 and 66, it is possible to move the frame 56 while maintaining the horizontality of the model holding plate 57 at high accuracy.

It is possible to evacuate these supporting members 65 and 66 upwardly by releasing the connection between the frame 56, as shown in FIG. 14, thereby facilitating the operation of mounting and dismounting the model holding plate 57 on and from the frame 56.

The elevator 8 is provided only one side of the container 2, so that it is possible to approach the movable base 67 from the other three sides of the container 2, thereby facilitating not only the operation of mounting and dismounting the model holding plate 57 but also the observation of the state in which the cured object is being produced.

According to this embodiment, since the supporting members 65 and 66 constitute a qudric link mechanism, as shown in FIG. 11, 13 and 14, it is possible to evacuate the supporting members 65 and 66 and the presser plate 59 to a position distant from the frame 65, and it is very easy to mount and dismount the model holding plate 57. Since the model holding plate 57 is held by being engaged with the stepped portion 58a and pressed by the presser plate 59, no treaded hole or the like is provided. Therefore, the model holding plate 57 is usable as a seat for the model to be displayed.

As described above, according to a movable base device for the third embodiment of an optical molding apparatus, since it is possible to obtain a high horizontal accuracy, a model having a high dimensional accuracy is produced. In addition, since it is possible to evacuate the supporting members, the operation of mounting and dismounting the model holding plate on and from the frame is facilitated.

In the present invention, various resins which are cured by light irradiation are usable. For example, modified polyurethane methacrylate, origo-ester acrylate, urethane acrylate, epoxy acrylate, photosensitive polyimide and aminoalkyd will be cited.

As the light, various kinds of lights such as visible light and ultraviolet light may be used in accordance with the photocurable resin used. The light may be used in the form of ordinary light, but if it is used as a laser beam, it is possible to enhance the energy level, shorten the molding time and enhance the molding accuracy by utilizing the good condensing property.

What is claimed is:

1. An optical molding apparatus used for an optical molding method including the steps of radiating light onto a photocurable resin so as to cure the resin at an irradiated portion and laminating the cured portions to form an object, said apparatus comprising:

a container having an aperture in one of a bottom portion and a side portion thereof, and a light transmitting plate with an inner surface situated in said aperture;

a base which is movable away from the inner surface of said light transmitting plate, said base being composed of a square frame;

a light radiation apparatus for radiating light into said container through said light transmitting plate; and a cured object holding plate which is mounted to and dismounted from above said base, said cured object holding plate being inserted into said frame.

2. An apparatus according to claim 1, wherein said cured object holding plate is provided on a surface facing said light transmitting plate with a sheet material.

3. A movable base device for an optical molding apparatus having a container with an aperture for accommodating photocurable resin and a light transmitting plate situated in said aperture, said optical molding apparatus being used for an optical molding method including the steps of radiating light onto the photocurable resin so as to cure the irradiated portion and laminating the cured portion to form an object, said device comprising;

an elevator mountable onto a peripheral edge of said container; and a base attached to the elevator and arrangable for facing the aperture in a bottom portion of the container for accommodating the photocurable resin, said base being moved up and down by the elevator; said base being provided with a frame, said frame being cantilever supported from the elevator, one end of the frame constituting a slide portion vertically moved along said elevator, a model holding plate removably mounted on said frame, at least one frame supporting member having one end rotatably connected to said slide portion for vertical rotation relative thereto, said frame supporting member having another end releasably connected to the cantilevered end of the frame said at least one frame supporting member assuming both a supporting state for supporting said frame when connected to said frame and an evacuated state when said at least one frame supporting member is released and said at least one frame supporting member is rotated upward.

* * * * *

UNITED STATES PATENT AND TRADEMARK OFFICE
CERTIFICATE OF CORRECTION

PATENT NO. : 5,009,585
DATED : April 23, 1991
INVENTOR(S) : Yoshinao Hirano et al It is certified that error appears in the above-identified patent and that said Letters Patent is hereby corrected as shown below:

Cover page, inventor's section, second inventor's name, change "Katsumo Sato" to --Katsumi Sato--.

Signed and Sealed this

First Day of September, 1992

*Attest:*

DOUGLAS B. COMER

*Attesting Officer*      Acting Commissioner of Patents and Trademarks